United States Patent
Lilot et al.

(10) Patent No.: US 9,646,267 B1
(45) Date of Patent: May 9, 2017

(54) FOLLOWING AN ENTITY IN A SOCIAL NETWORK

(71) Applicant: GOOGLE INC., Mountain View, CA (US)

(72) Inventors: Jean-Christophe E. Lilot, Mountain View, CA (US); Nishant A. Thakkar, Mountain View, CA (US); Pavan Desikan, Palo Alto, CA (US); David M. Byttow, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/667,792

(22) Filed: Nov. 2, 2012

Related U.S. Application Data

(60) Provisional application No. 61/556,156, filed on Nov. 4, 2011.

(51) Int. Cl.
　　*G06F 15/16*　　(2006.01)
　　*G06Q 10/00*　　(2012.01)
(52) U.S. Cl.
　　CPC .................................. *G06Q 10/00* (2013.01)
(58) Field of Classification Search
　　CPC .............................. H04L 51/32; G06Q 50/01
　　USPC ........................................................ 709/204
　　See application file for complete search history.

(56) References Cited

U.S. PATENT DOCUMENTS

| | | | | |
|---|---|---|---|---|
| 8,521,817 B2* | 8/2013 | Ryan | ...................... | G06Q 50/01 705/319 |
| 8,615,520 B2* | 12/2013 | Fallah | .................... | G06Q 30/08 705/14.53 |
| 2008/0228775 A1* | 9/2008 | Abhyanker et al. | ............ | 707/10 |
| 2010/0146118 A1* | 6/2010 | Wie | .............................. | 709/225 |
| 2011/0004519 A1* | 1/2011 | Aleong et al. | ............. | 705/14.53 |
| 2012/0110076 A1* | 5/2012 | Su et al. | ........................ | 709/204 |
| 2012/0150960 A1* | 6/2012 | Nalawade | ..................... | 709/204 |
| 2014/0222705 A1* | 8/2014 | Aladdin et al. | ............... | 705/321 |

\* cited by examiner

*Primary Examiner* — Bryan Lee
*Assistant Examiner* — Oluwatosin Gidado
(74) *Attorney, Agent, or Firm* — Lowenstein Sandler LLP

(57) ABSTRACT

Methods, systems, and computer programs are presented for managing the visibility of relationships within a social network. One method includes an operation for enabling a person to establish a first follow relationship from the person to an entity in the social network. However, the entity is disabled to establish a second follow relationship from the entity to the person until the first follow relationship from the person to the entity is established. Further, the establishment of the first follow relationship with a limited visibility is detected, and the establishment of the second follow relationship is also detected. The method further includes an operation for disabling a user in the social network to obtain visibility of the second follow relationship if the first follow relationship is invisible to the user.

22 Claims, 14 Drawing Sheets

Fig. 4A

FOLLOWING AN ENTITY IN A SOCIAL NETWORK

CLAIM OF PRIORITY

This application claims priority from U.S. Provisional Patent Application No. 61/556,156, filed Nov. 4, 2011, and entitled "Following an Entity in a Social Network." This provisional application is herein incorporated by reference.

BACKGROUND

The present disclosure relates to methods, systems, and computer programs for managing the flow information about users of a social network, and more particularly, for managing the visibility of relationships between persons and non-person entities.

The communication capability provided by social networks has opened new forms of communication in today's society, making it easier for people to communicate with each other, as well as providing new vehicles of communications between people and businesses, or with other community groups. As people's interest in using social networks for communication has grown, so has the interest of businesses in using social networks to communicate with people, enabling a new form of communication for keeping customers informed and promote their products.

SUMMARY

Embodiments provide methods, systems, and computer programs for managing the visibility of relationships and communications within a social network. It should be appreciated that the present embodiments can be implemented in numerous ways, such as a process, an apparatus, a system, a device or a method on a computer readable medium. Several embodiments are described below.

In one embodiment, a method includes an operation for enabling a person to establish a first follow relationship from the person to an entity in the social network. The entity is disabled to establish a second follow relationship from the entity to the person until the first follow relationship from the person to the entity is established. Further, the establishment of the first follow relationship with a limited visibility is detected, and the establishment of the second follow relationship is also detected. The method further includes an operation for disabling a user in the social network to obtain visibility of the second follow relationship if the first follow relationship is invisible to the user, where at least one operation of the method is executed through a processor.

These and other embodiments can include one or more of the following features:

Omitting the person from a list of users following the entity when the user views a profile of the entity.

Omitting the person from a list of users that the entity is following when the user views a profile of the entity.

Omitting the entity from a list of users followed by the person when the user views a profile of the person.

Omitting the entity from a list of users following the person when the user views a profile of the person.

The limited visibility is one of a restricted visibility or a private visibility, where the restricted visibility shows a relationship to users in communications groups defined by the person, and the private visibility makes the relationship invisible to everyone, where a relationship without limited visibility is viewable by everyone.

Detecting that the user has visibility to the second follow relationship when considering visibility restrictions set by the entity; and making the second follow relationship invisible to the user if the first follow relationship is invisible to the user.

Determining visibility to the user of the first follow relationship based on visibility parameters defined by the person and visibility parameters set by the entity.

Disabling the entity from following the person publicly in response to the first follow relationship being limited.

Enabling the person to define visibility of relationships in a profile of the person.

Enabling the person to specify which communication groups are viewable; and enabling the person to specify if people in the communication groups of the person are one of: visible to everyone, or visible to the people in the communication groups.

The limited visibility is one of a restricted visibility or a private visibility, where the restricted visibility shows a relationship to users in communications groups defined by the person, and the private visibility makes the relationship invisible to everyone, where a relationship without limited visibility is viewable by everyone.

In another embodiment, a method includes an operation for enabling a person to establish a first follow relationship from the person to an entity in the social network, where the entity is disabled to establish a second follow relationship from the entity to the person until the first follow relationship from the person is established. In addition, an establishment of the first follow relationship with a limited visibility in the social network is detected. In response, the entity is disabled from establishing the second follow relationship when the first follow relationship has limited visibility, where at least one operation of the method is executed through a processor.

These and other embodiments can include one or more of the following features:

The operations of the method are performed by a computer program when executed by one or more processors, the computer program being embedded in a non-transitory computer-readable storage medium.

In yet another embodiment, a computer program embedded in a non-transitory computer-readable storage medium, when executed by one or more processors, for managing a visibility of relationships within a social network, includes program instructions for enabling a person to establish a first follow relationship from the person to an entity in the social network, where the entity is disabled to establish a second follow relationship from the entity to the person until the first follow relationship from the person is established. Included are additional program instructions for detecting an establishment of the first follow relationship with a limited visibility in the social network, and program instructions for detecting an establishment of the second follow relationship. The computer program also includes program instructions for disabling a user in the social network to obtain visibility of the second follow relationship when the first follow relationship is invisible to the user.

These and other embodiments can include one or more of the following features:

Program instructions for omitting the person from a list of users following the entity when the user views a profile of the entity.

Program instructions for omitting the person from a list of users that the entity is following when the user views a profile of the entity.

Program instructions for omitting the entity from a list of users followed by the person when the user views a profile of the person.

Program instructions for detecting an addition of the entity to a group of the person with limited visibility.

Program instructions for enabling the person to specify which communication groups are viewable; and program instructions for enabling the person to specify if people in the communication groups of the person are one of: visible to everyone, or visible to the people in the communication groups.

In yet another embodiment, a system includes a social network server and a processing server. The social network server enables the establishment of a first follow relationship from a person to an entity in the social network. Further, the processing server disables an establishment of a second follow relationship from the entity to the person until the first follow relationship from the person is established. The processing server, upon detecting the establishment of the first follow relationship with a limited visibility in the social network and upon detecting the establishment of the second follow relationship, disables a user in the social network to obtain visibility of the second follow relationship when the first follow relationship is invisible to the user.

These and other embodiments can include one or more of the following features:

The processing server omits the person from a list of users following the entity when the user views a profile of the entity.

The processing server omits the person from a list of users that the entity is following when the user views a profile of the entity.

The processing server omits the entity from a list of users followed by the person when the user views a profile of the person.

The processing server omits the entity from a list of users following the person when the user views a profile of the person.

The limited visibility is one of a restricted visibility or a private visibility, where the restricted visibility shows a relationship to users in communication groups defined by the person, and the private visibility makes the relationship invisible to everyone, wherein a relationship without limited visibility is viewable by everyone.

These embodiments may provide one or more of the following advantages: manage a flow of communications with entities; providing privacy options to user to the visibility of relationships with other people or with other entities; and providing an option to follow an entity without visibility to other users.

Other aspects will become apparent from the following detailed description, taken in conjunction with the accompanying drawings.

BRIEF DESCRIPTION OF THE DRAWINGS

The embodiments may best be understood by reference to the following description taken in conjunction with the accompanying drawings.

FIGS. 4A and 4B show a profile page of an entity in the social network, according to one embodiment.

DETAILED DESCRIPTION

The following embodiments describe methods, systems, and computer programs for managing the visibility of relationships and communications within a social network. It will be apparent, that the present embodiments may be practiced without some or all of these specific details. In other instances, well known process operations have not been described in detail in order not to unnecessarily obscure the present embodiments.

Figure 1:
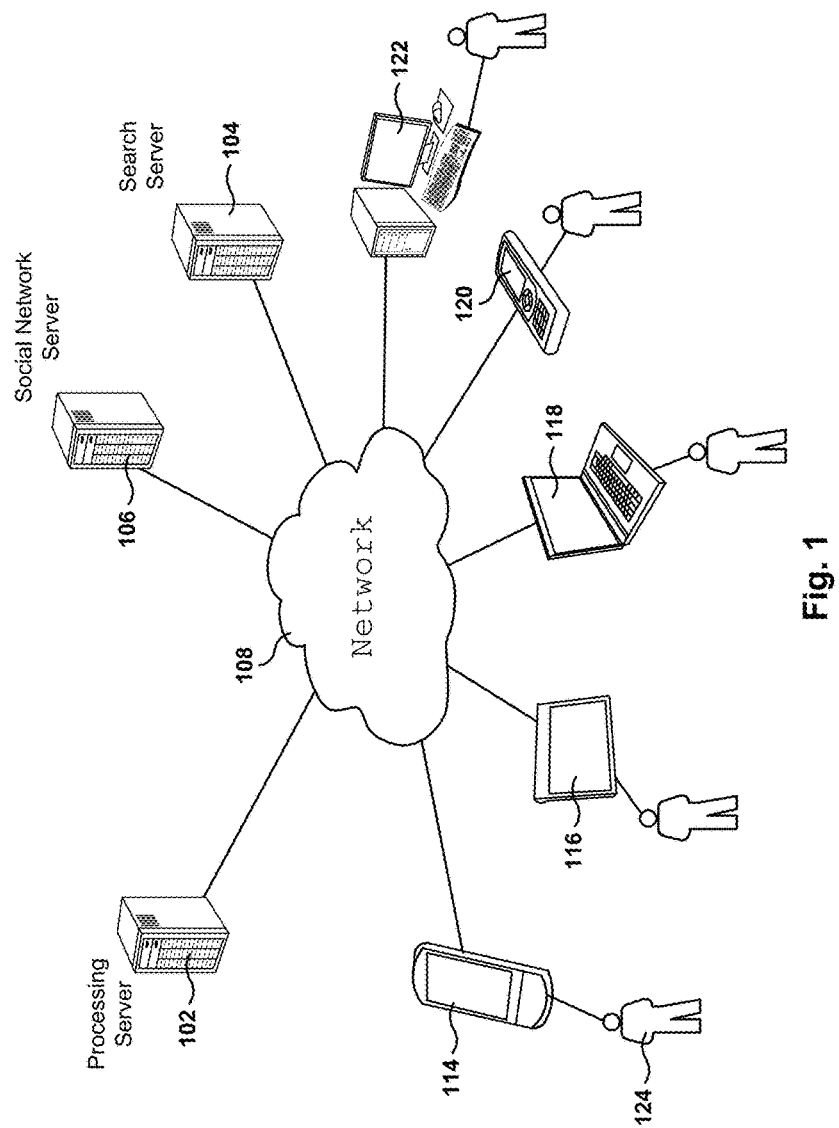
FIG. 1 provides one example architecture of a system that may utilize embodiments described herein.

FIG. 1 provides one example architecture of a system that may utilize embodiments described herein. Users 124 interact with each other in the context of a social network, where users include real people and entities. In one embodiment, entities perform interactive actions similar to people, although an entity may not be an individual person. For instance, an entity may be a commercial enterprise that may wish to market goods or services. In some embodiments, a person may be an entity as well when the person is acting as a public figure, such as a popular artist, a political figure, a world leader, etc. Each user has an account in the social network, and the account includes at least a user name. In addition, each account includes a profile of the user with additional information about the user, such as, residence, favorite activities, etc. The user is in control of what information is added to the profile, and what information is shared with others. A user may access the social network through different devices such as a smart phone 114, a tablet computer 116, a laptop 118, a mobile phone 120, a personal computer 122, or any computing device that provides access to the Internet. Of course, the illustrated devices are only examples.

In one embodiment, social network server 106 delivers services that enable users to interface with each other. The social network provides a site that enables users to define user accounts, which can be accounts for people and entity accounts. Through those accounts, users are able to connect with their friends, group of friends, entities, groups of entities, etc. In one embodiment, the relationships established in the social network may be utilized in other contexts. Processing server 102 manages electronic messages between persons and non-person entities, by enforcing rules that enable or disable electronic messages and/or actions within the social network. Search server 104 provides Internet search capabilities.

In one embodiment, the social network provides customizable controls that people may use to manage interactions and electronic messages with non-person entities. In one example, the logic executing the social network may define various services and controls. One example service is designed for real person users (e.g., people accounts). Another example service is designed for non-person entities (e.g., entity accounts). The entity account of the entity, on the other hand, is similar to a user account of a person, however, the services and controls are different. As noted above, an entity may be a business, a famous person or figure, a commercial figure, an artist, a celebrity, a government group, a brand, a political figure, a community association, a non-profit organization, an entity that provides services, an entity that provides goods, an entity that provides goods and services, etc. Furthermore, the entity may provide its goods or services primarily on the Internet, primarily as a brick and mortar outfit, or a combination thereof. For description purposes, a real person may be referred to herein as a person, people, or an individual.

For description purposes, a non-person entity may be referred to herein as simply an entity, a company, a corporation, a business, an entity account, etc. An entity may be a user, although its use will be through an entity account. A user, as referred to herein, is a generic term for a person or entity, unless otherwise noted. A non-entity user, therefore, may utilize the social network through a user account.

In one embodiment, the social network provides entities with a specific type of interface for posting messages, messaging, sharing, and generally interacting within the social network. In one embodiment, this interface for entities is referred to as "entity pages," indicated by a token, e.g., "+", followed by the name of the entity in the social network (e.g., Acme corporation has a "+Acme" page). Real-persons have "person pages," which are different from entity pages and have different functionality, although some features are common to both entity pages and person pages. Although the symbol "+" and word "plus" is referred to herein as denoting a type of site or place within the social network, it should be appreciated that any symbol, identifier, word, or character may be used to define or identify the social services. In an alternate embodiment, the services can be provided without the use of any special symbols or denoted nomenclature. Thus, so long as the social network site provides the functionality defined herein, the nomenclature utilized to denote the services can take on any form, format or identifier.

In one embodiment, a real person may act as an entity. For example, the real person may be a public figure which uses the social network to promote commercial or social activities associated with this persona. In this case, the person is treated by the social network as an entity because the main purpose of the public figure is to promote commercial or social activities. This person may, for example, have a user account as well as an entity account. The user, when acting for the entity, will login to her entity account. The user can therefore act in various roles, consistent with their login parameters or assigned privileges. In one embodiment, a user can have multiple privileges, which will allow the user to log into her one account, and based on her privileges, will be allowed to access both accounts. Alternatively, each account will have its own login.

In one embodiment, a person is in control of her relationships with entities (e.g., entity pages). In one embodiment, interactions between person and entity require person approval (e.g., an addition of the entity page to the person's social network, or a mention by the person of the entity, which are discussed in more detail below). Otherwise, entity pages present a similar behavior as person pages, once the person has initiated engagement with the entity.

Other embodiments may utilize different servers, have the functionality of one server distributed over a plurality of servers, have the functionality of two or more servers combined into a single server, have a different amount of user categories in the social network, categorize users by different criteria, etc. The embodiments illustrated in FIG. 1 should therefore not be interpreted to be exclusive or limiting.

Figure 2A:
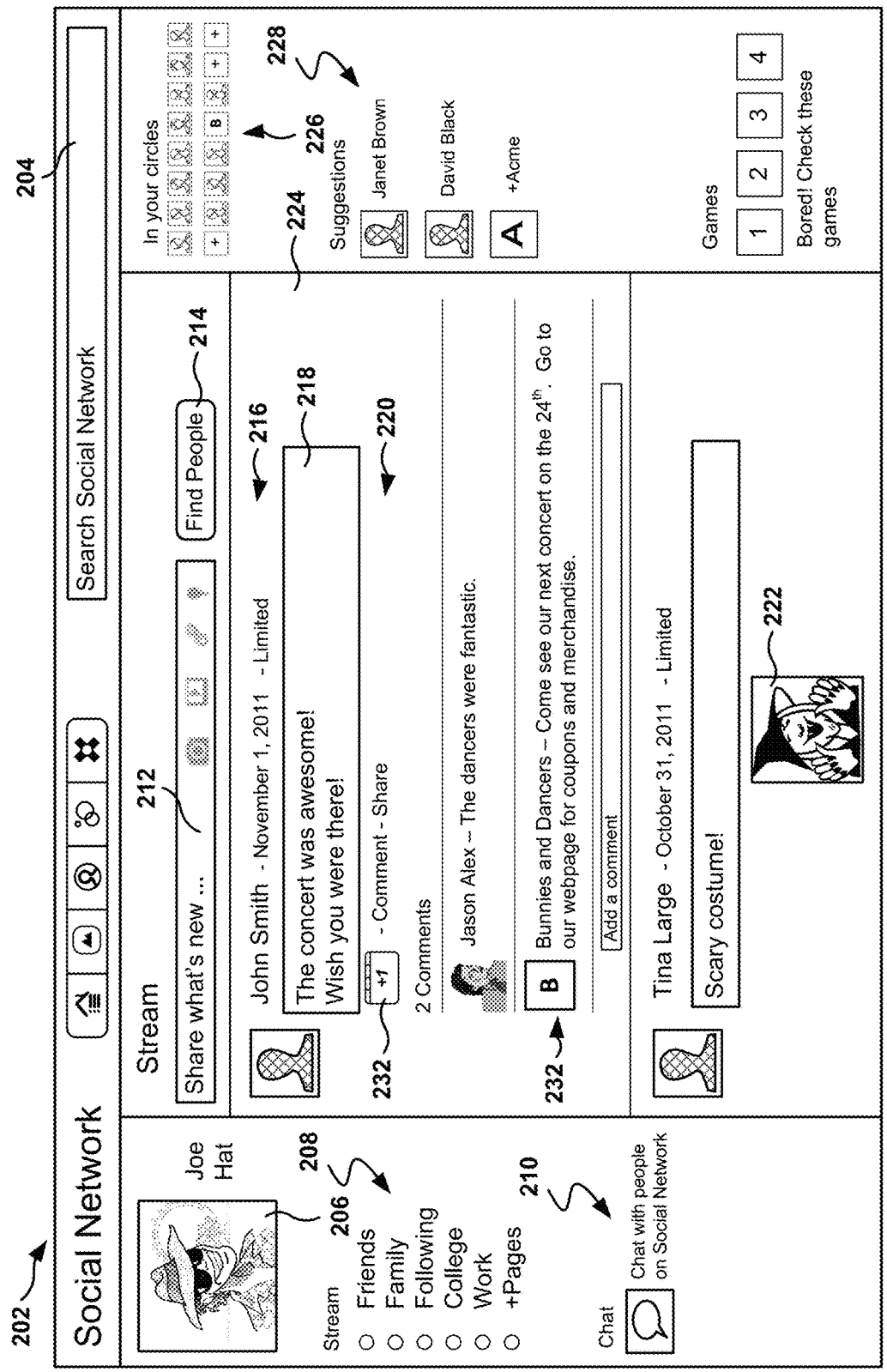
FIG. 2A is a person's web page for interfacing with a social network, according to one embodiment.

FIG. 2A is a person's web page for interfacing with a social network, according to one embodiment. For example, the person (named Joe Hat) is shown logged into his user account. In one embodiment, the posts received by a user are referred to as the content of a stream in the social network. Page 202 is an example snapshot of a page for viewing a person's stream in the social network. Search field 204 is an input area for searching the social network or other Internet content.

In one embodiment, the stream is presented in a middle panel of page 202. Input box 212 enables the person to add new posts in the social network. When the person enters a new post, the person is able to select the destination for the post. The destination could be the complete social network (e.g., a public post), a person, or one or more groups defined by the person.

In one embodiment, the groups defined by the person are referred to as "circles," but other configurations for defining groups are also possible. Examples include various graphically designed interfaces or text based lists, dialog boxes, pull downs, radio buttons, and other interfaces defined from a combination of graphical elements, text, images, pictures, combinations thereof, etc. More details regarding the creation of circles are provided below with reference to FIG. 3. In one embodiment, the post may be a text message, a photo, a video, a link to a webpage, or a location of the person. Thus, the content and form of the post should be broadly construed to include any data that can be presented, displayed, listened to, interfaced with, received, sent, shared, approved, or disapproved, etc.

In one embodiment, the stream includes posts added by the person, by others socially linked to the person, or by an entity that the person has chosen to follow (e.g., be linked with/to in the social network). In one embodiment, an entity may be restricted from posting to a person's stream, unless the person has established a social link with the entity beforehand, e.g., the person has chosen to follow the entity.

In one embodiment, the visibility of the follow relationship from the person to the entity may be set to public (e.g., the relationship is visible to all users in the social network), the visibility may be set to private (e.g., the relationship is hidden to all users in the social network), or the visibility may be set to restricted (e.g., the relationship is visible only to certain users, such as to those users in the circles of the person). For description purposes, we refer to limited visibility as a visibility that is not public, which means that limited visibility includes private visibility (nobody can see the relationship) and restricted visibility (some can see the relationship, but not everyone). In one embodiment, restricted visibility means that the content of a person's circle is visible to the users defined in any of the person's circles, e.g., anyone in the person's circle can see who the user is following. The restricted visibility is also referred to as circle visibility, or visible to the circles of the person.

In one embodiment, each post 224 may include information 216 about the author, the timestamp of the post, and the scope of the post (e.g., public, limited, etc.). Example post 224 may include a text message entered by person "John Smith," but other types of posts are possible, such as photo 222, a video, a link, data, etc. The social network provides options 220 to respond to the post, such as providing an endorsement of the post, adding a comment 232 to the post, or sharing the post with others. It is noted, that in the example of FIG. 2A, the entity Bunnies and Dancers has posted a comment in the user's stream. The entity is allow to post in the viewer's stream because the entity is in the viewer's (e.g., Joe Hat's) circles, as shown in the list 226 of users that are in the viewer's circles.

As used herein, an endorsement is a public recommendation of an item, such as a webpage, a person, a post, an entity, etc. An endorsement may also be referred to or provided as an acknowledgment, a +1, a thumbs-up, a √ (check) mark, a confirmation, a ratification, a validation, a seal of approval, a testimonial, support, advocacy, an approval, a ratification, etc. In one embodiment, a button is provided in various web pages to enable the person to provide his or her endorsement. See for example +1 button 232. The various web pages can be pages on accounts of the social network, on pages of third party web sites, on search pages, in lists of search results, etc. The +1 button 232 is provided, in one embodiment, as an icon that can be selected by the user. When selected, the count associated with the +1 button is displayed, so as to provide the user with information regarding the number of other users that may have selected the +1 button.

Therefore, an endorsement button is not limited to use in the social network, and the endorsement button may appear in a variety of places and sites across the Internet. For example, an endorsement button may be next to an Internet search result, an Internet ad, a news article, a product, etc. When the person presses the endorsement button, a count associated with the item endorsed is incremented. The count measures the popularity of the item, and as people endorse an item, the counter associated with the item increases. In one embodiment, the action of endorsing an entity in the social network does not cause the entity to be linked with the person in the social network. In another embodiment, for a link to be established in the social network between the person and the entity, a different operation is required where the person explicitly adds the entity to the person's social network. The explicit add can by performed by user selection on an interface, addition of an entity to one of their groups, e.g., circle, or selection of a button, icon, or some input control to follow the entity. The following can also be triggered automatically, based on the user's approval to take this action each time the user views, finds, selects, or interfaces with an account of an entity.

In one embodiment, a "mention" is an explicit reference to a user in a message. A mention allows the creator of the post to grab someone's attention to a post because of the introduction of a mention identifier with, for example, someone's name. In one embodiment, a mention is performed by utilizing the '+' or '@' signs followed by the name of a person or entity. It is noted that a "+" sign may be used to mention a person or an entity. When a person or an entity is mentioned within the context of the social network, the person or entity may receive a notification that they have been mentioned in a post (depending on notification settings). The user is also able to see the entirety of the post on which the user is mentioned, even if the post wasn't originally shared with the user.

Button 214 gives the person the ability to enter a different webpage, which provides an interface to identify search parameters for finding people or entities in the social network. A profile picture of the person 206 may be provided on the left side of page 202. In addition, stream filtering options 208 allows the person to limit or tune what is presented on the stream. In one embodiment, the filtering options included radio buttons to select or deselect the groups created by the person. In addition, the filtering options also include a radio button to enable or disable messages from entity pages in the stream. Although radio buttons are used, other types of user selectable controls may be used, such as drop downs, text fields, toggles, voice inputs, etc. In one embodiment, a chat button 210 is provided to allow the person to engage in conversation with others in the social network. On the right panel, icons 226 represent users in the social network that are linked with the person. In addition, the social network provides suggested new users in area 228. It is again noted that the layout of the features on the page 202 is only one example, and the layout can vary based on site designer preferences.

Embodiments allow people to be in control of social messages. For an entity to initiate communication with the person, the person has to first add explicitly the entity to its social network. In one embodiment, an entity is not able to initiate messages in the social network with a person that has not added the entity to its social network, or that has explicitly mentioned the entity in a post.

The person is able to perform certain operations affecting the relationship between the person and the entity. The person may endorse the entity, or the person may add the entity to one of her social groups defined in the social network. In one embodiment, the fact that the person endorses an entity does not enable the entity to freely initiate full messaging or posts with the person. Of course, if the person and the entity are socially linked, the entity may initiate messaging with the person and post on the person's user account.

Figure 2B:
FIG. 2B is a web page for entering user profile attributes, according to one embodiment.

FIG. 2B is a web page for entering user profile attributes, according to one embodiment. The user has selected option "About" in a home page to edit the profile. In one embodiment, one or more profile attributes are entered the first time that a user signs up the social network. Some user attributes are mandatory, such as name 254, in order to create the account. Additionally, the user has the option of adding other attributes when joining the social network, or at a later time by going to page 252 to add or change profile attributes.

A list of user attributes is provided on entry panel 258. Next to each attribute, the current value of the attribute is presented, if the value exists. In the example of page 252, the person has and occupation of "Surfer," has his place of employment at "Joe's Emporium," etc. When the user selects one of the attributes, an input window is presented, which provides one or more fields to the user for entering the appropriate values for the attribute. The value for an attribute may be a single item, such as age, or may include a list of values, such as "places to live." Other attributes may include text (e.g., introduction), photos (e.g., profile photos), addresses, phone numbers, etc.

When the user enters values for the profile, the user may set a privacy setting for selecting the visibility of this attribute to others in the social network. In one embodiment, the options are "Anyone on the web," Extended circles (friends and friends of friends), Your circles (shown only to those in the person's circles), Only you (visible only to the user), and Custom, which provides further options for defining the privacy settings of the attribute. In one embodiment, the attributes present in the profile of the user also include attributes that the user has entered in other Internet services.

On the left panel, a list 268 of users in the viewer's circles is presented, as well as a list 270 of users that have the viewer in their circles. This means that list 268 shows the list of users that the viewers is following, and list 270 show the users that are following the viewer. Of course, list 270 will not show the users that have not enabled others, such as the viewer, to see the relationship to the viewer.

The viewer may change the visibility of lists 268 and 270 to other users in the social network. When the user selects option 260 to change the visibility of these users, and input window 266 is presented to define the visibility of both lists. In box 262 the user may select the following options:

1. Whether to show the people in the viewer's circles or not.

2. To select which circles are visible to others. If this option is selected, input box 264 is presented, where the viewer may check (be visible) or uncheck (be invisible) each circle. If a circle is not visible (e.g., "Invisibles" in the example), the users defined in this circle will not be shown as being in the viewer's circles (unless, of course, a user in the "Invisible" circle is also present in another circle that is visible).

3. Whether to show the content of the circles to everyone (e.g., "Anyone on the web") or only to the viewer's circles (e.g., "Your circles"). Of course, the content of the circles will be shown for the circles selected in the option #2 described in the previous paragraph.

4. Whether to show or hide the users that are following the viewer (e.g., the users that added the person to their circles).

It is appreciated that the embodiment illustrated in FIG. 2B is exemplary. Other embodiments may utilize different attributes, present the attributes in a different form, have different privacy and visibility options, etc. The embodiments illustrated in FIG. 2B should therefore not be interpreted to be exclusive or limiting.

Figure 3:
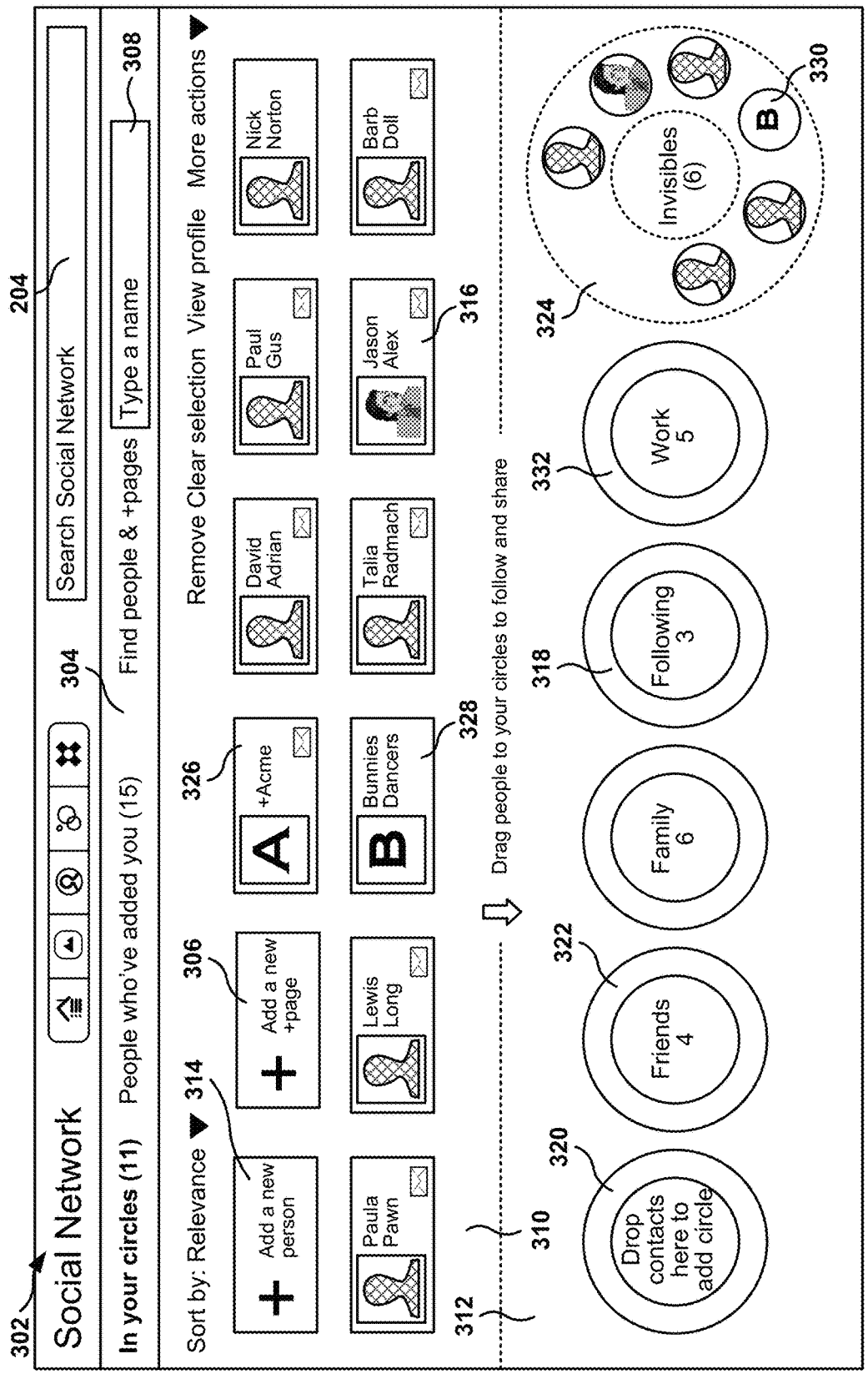
FIG. 3 is a web page for managing user groups within the social network, according to one embodiment.

FIG. 3 is a web page 302 for managing user groups within the social network, according to one embodiment. Bar 304 provides selections options for choosing users, which are then displayed in users area 310. In the embodiment shown in FIG. 3, the person has selected the option "In your circles" to display users that are currently in the person's circles (e.g., user defined groups). A second option in bar 304 allows the selection of persons that have added the owner of the page to their groups in the social network. In addition, bar 304 includes an input field 308 to search for people or entities.

Users area 310 displays icons, images, pictures or indicators associated with several users, and circles area 312 includes the groups defined by the user. In one embodiment, the person is able to add users to the circles in circles area 312 by selecting a user icon, dragging the icon to the circles area 312, and dropping the icon in one of the circles. To delete a user from a circle, the user icon inside the circle is dragged from the circle and dropped outside the circle. In one embodiment, when the person moves the mouse over a circle, the circle is enlarged to show the user icons corresponding to the users belonging to that circle. For example, after placing the mouse over circle 324, circle 324 is expanded, having now a larger size than the other circles, and presents the users currently in that circle. Other circles, such as circle 322 named "Friends," are presented in a smaller size than circle 324 and do not show their contents. To create a new circle, the person can drop a user from users area 310 in circle 320.

In one embodiment, the social network creates a default circle for inclusion of entity pages. The embodiment of FIG. 3 provides a circle 318 named "Following" for inclusion of entity pages. The entity pages do not have to be added to circle 318, and may be added to any of the circles defined by the person. In one embodiment, persons and entities can also be added to more than one circle. In one embodiment, when a person starts following an entity, the entity is automatically added to the "Following" circle, although the person may later remove the entity or moving to another circle. In another embodiment, when the decision is made to follow an entity, a drop down provides the user with options to add the entity to any one of the circles previously created by the user or to a following circle. This option allows for direct adding of users to circles, without first adding them to the following circle 318.

The users in user area 310 can be real persons (e.g., person 316 "Jason Alex") or can be entities (e.g., entity 326 "+Acme"). People are able to place real persons or entities in any of the circles below, and a circle may have just people, just entities, or a mix of people and entities.

In one embodiment, user area 310 also includes a couple of selection boxes for adding persons 314 or entities (e.g., +pages) 306. When the person selects one of these boxes, options are presented to enter the name of a person or an entity, or to perform a search on the social network. In another embodiment, a unique box is presented to search for people or entities. In one embodiment, once the person enters a "+" sign as the first character of the search, the social network limits the search to entities. Otherwise, the search is limited to real persons. Again, it should be understood that any other symbol or token can be used to filter, identify or modify a search query.

In one embodiment, the social network provides an option to follow other users privately, which means that the follow relationship is hidden (e.g., not visible) to other users in the social network (see above with reference to FIG. 2B). In the example of FIG. 3, circle 324 is invisible, which means that the contents of circle 324 are not visible to anyone.

In one embodiment, the social network provides an option to follow other users anonymously (not shown). If a person follows another user anonymously, the person will be able to see the public posts of the user, and the person or entity being followed will not be aware that this person is following them. The anonymous follow relationship is kept hidden from all the users in the social network, including the user being followed.

Figure 4A:
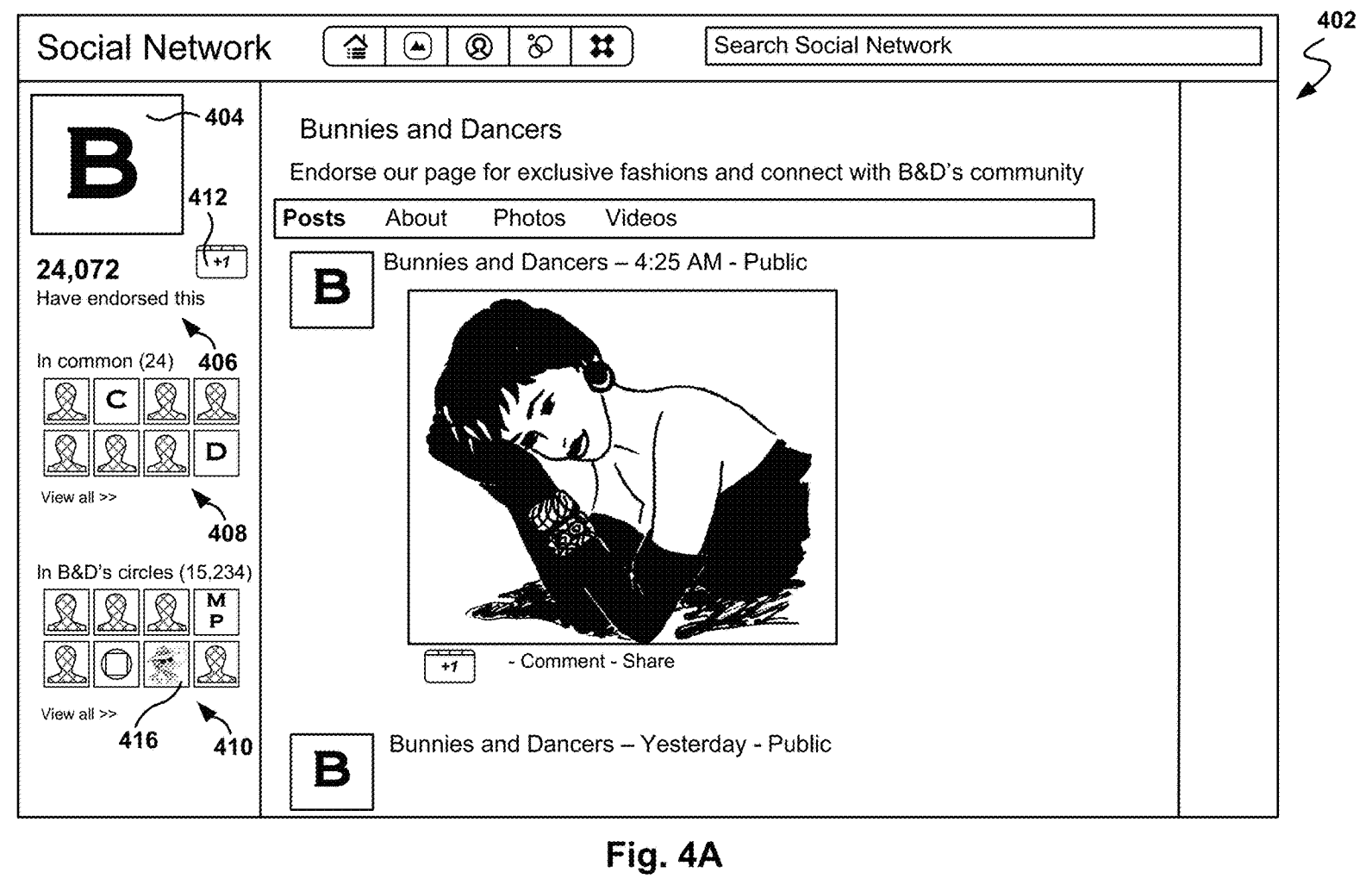
Figure 4B:

FIGS. 4A and 4B show the profile page of an entity in the social network, according to one embodiment. FIG. 4A shows the profile page 402 of an entity (named "Bunnies and Dancers") in the social network, according to one embodiment. When a user clicks on the name of another user, the associated profile page for the user is presented. FIG. 4A shows the profile page of the entity as seen by a viewer that is a different from the user whose stream is shown in FIG. 2A (user Joe Hat). In the middle panel, posts from the entity that are visible to the viewer are presented, with a similar format to the posts shown in the stream of FIG. 2A.

The profile page 402 includes a region that can accept an icon 404 associated with the entity and the name of the entity next to the icon 404. In addition, an endorsement button 412 gives the viewer an option for endorsing the entity associated with the profile page. Counter 406 provides information about the number of users that have endorsed this entity. In one embodiment, the profile page of a person may not include endorsement button 412. In another embodiment, the social network allows for the endorsement of real people, and an endorsement button is available to endorse people.

In one embodiment, the social network enforces a privacy mechanic, e.g., a policy, to protect people from undesired messages. In one embodiment, the policy defines two types of users: people and entities. The messaging rules in the social network are different for people and for entities. A person may initiate contact with an entity, but the entity may not initiate contact with the person. Once the person establishes a social link with the entity (e.g., the person adds the entity to one or more circles), then the entity may start messaging with the person. In one embodiment, an entity may initiate contact with other entities (of course, subject to user privacy settings), but not with real people (e.g., people accounts). This policy puts the person in command of the message flow between people and entities.

Profile page 402 also includes information about users 408 in the user's circles that are also following this entity, e.g., users "in common" following this entity. This information helps the entity improve its corporate image by showing related users that also are associated with the entity. In addition, information 410 is provided about users or entities of the social network that are in the entity's circles but that are not currently in any of the user's circles. Here, the viewer seeing the entity's profile page sees that user Joe Hat 416 is being followed by Bunnies and Dancers (e.g., Joe Hat is in B&D's circles). The viewer see's user 416 because the entity (B&D's) is following user 416 publicly, so everyone has visibility to this relationship. However, user 416 may be following the entity privately, which means that the viewer does not have visibility that user 416 is following the entity. However, due to the policy the viewer is able to infer that user 416 is following this entity, because, otherwise, the entity could not be following user 416.

FIG. 4B shows an embodiment of a web page 452 where users that follow the entity privately (or semi-privately) are not shown in user areas 408 and 410. FIG. 4B shows that user 416 Joe Hat of FIG. 4A is not shown in page 452 because user Joe Hat is following the entity Bunnies and Dancers privately. Therefore, the visibility that the entity is following the person is conditioned on the visibility that the person is following the entity. More details are given below with reference to FIGS. 6A-6E.

Figure 5A:
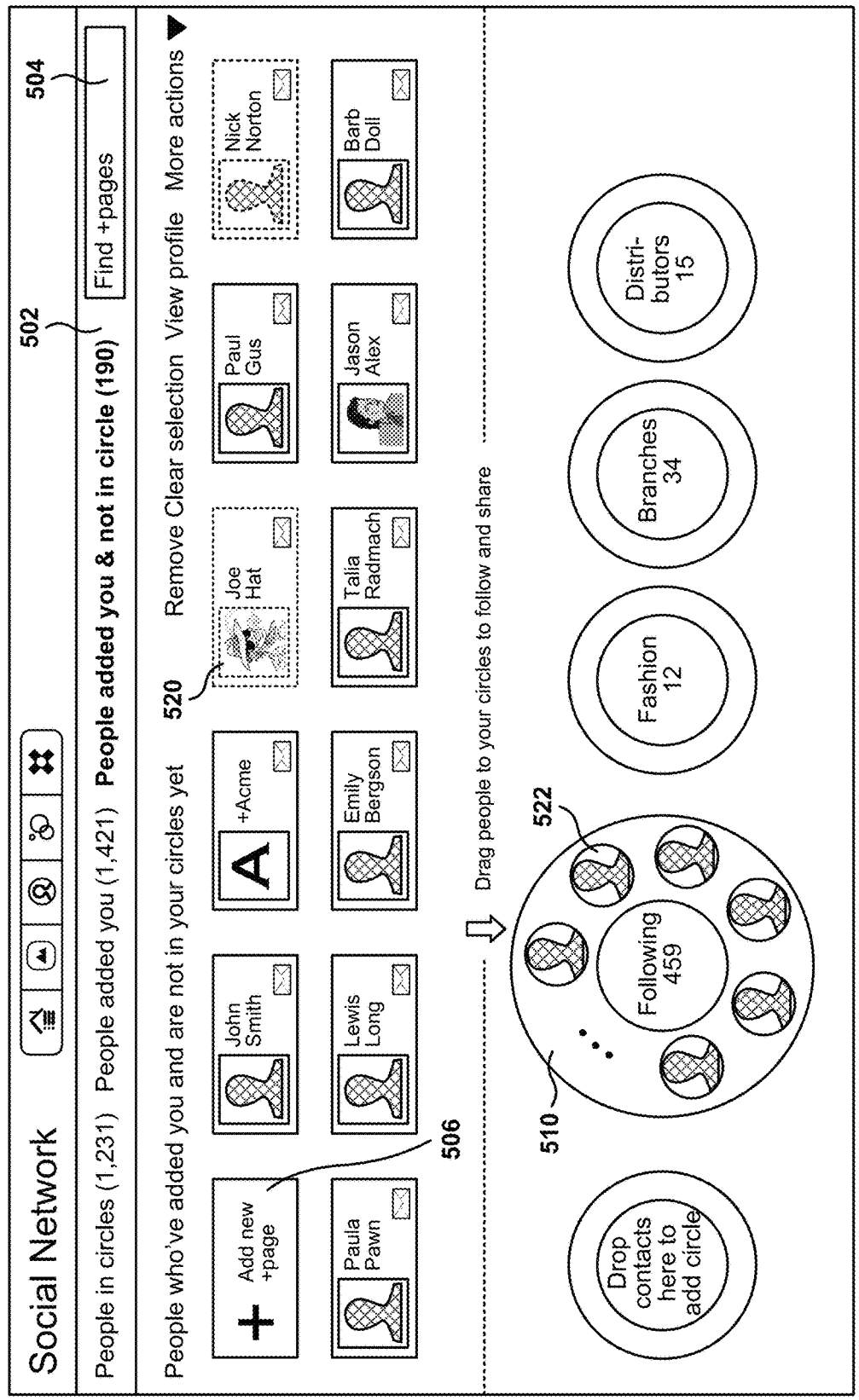
FIGS. 5A and 5B are embodiments of web pages for the management of user groups by an entity.
Figure 5B:
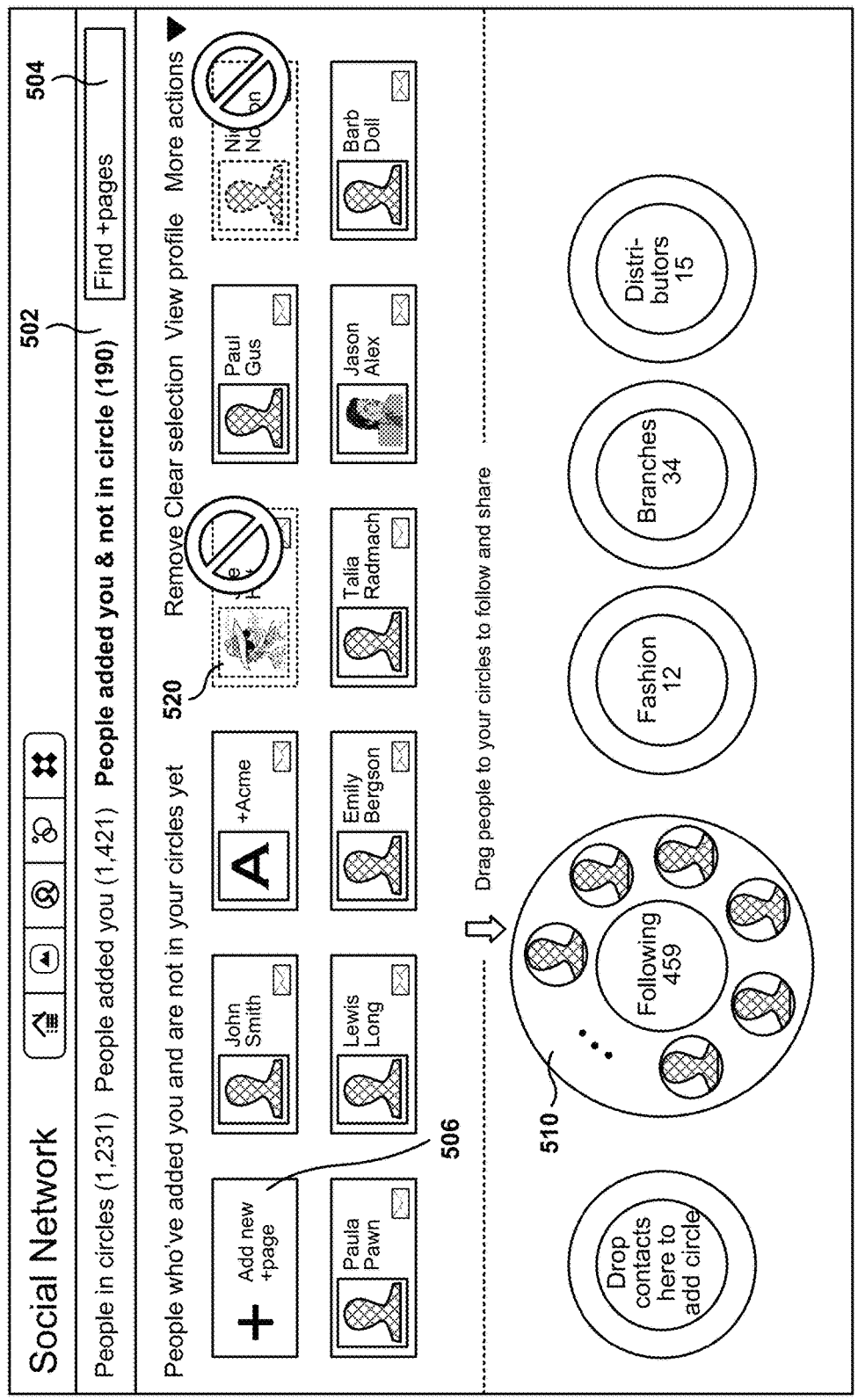

FIGS. 5A and 5B are embodiments of web pages for the management of user groups by an entity. FIGS. 5A and 5B show different embodiments for keeping private follow relationships hidden to users of the social network. FIG. 5A is a web page for the management of user groups by an entity, according to one embodiment. In the embodiment of FIG. 5A, entities are allowed to follow users that are following the entity with limited visibility. However, the fact that the entity is following the user is kept invisible to other users in the social network, if disclosing this relationship would reveal or hint to other users (which didn't already know) that the user is following the entity. Bar 502 for selecting users includes options for showing people already in the entity's circles, showing people that are following the entity, and showing people that are following the entity and not yet in a circle.

The search box 504 is different from the search box 308 of FIG. 3 because an entity cannot search for people, or be allowed to find people to first approach. An entity may only search for other entities (e.g., +pages). Additionally, because the entity may not search for people, the circle editor for entities does not include the icon 314 of FIG. 3 to add new persons. Entities are only provided with icon 506 to add other entities. Although the functions of this mechanic are described with reference to icons that are present or not present, other icons, text, windows, selection features may be used.

In one embodiment, the social network provides a default circle 510 to the entity for adding users followed by the entity. Circle 510, named "Following" in the sample of FIG. 5A, is intended to be used for adding users that are being followed by the entity, in response to the person's initiated following of the entity. However, the entity may add other circles and organize the users followed as desired by the administrator of the entity page. For example, the embodiment of FIG. 5A illustrates a page that includes, besides the Following circle 510, a Fashion circle (e.g., to include other related companies in the fashion industry), a Branches circle (e.g., to include retail outlets for the entity), and a Distributors circle (e.g., to include the distributors that carry the entity's products).

The entity may add each user to more than one circle. For example, the entity might create circles by geographic location in order to better target marketing messages (e.g., United States, South America, Europe, Asia, etc.), or may create circles according to demographic criteria (e.g., 18-25 years old, 25-50, and 51+). The number and type of circles (e.g., groups) created by the entity are limitless. The circles can be created for limited times, and people can be dynamically moved by the entity or an process set by the entity.

In one embodiment, the social network provides an automatic creation of circles, based on the parameters selected by the entity and executed by the process, or based on user characteristics. In one embodiment, this feature is referred to as suggested circles. Each suggested circle is associated with a respective one or more attributes, such as geographic location, language, country, etc.

FIG. 5B shows a web page of an embodiment where entities are not allowed to follow users that are following the entity privately. In one embodiment, the private followers are shown with a special formatting (e.g., dotted lines) and an indication that the private follower may not be added to the entity's circles. In one embodiment, the indicator is a universal "prohibited" icon, but other forms of icons, formatting, text messages, etc., may be used to indicate that this user may not be added to circles. In one embodiment, if the administrator of the page tries to add a private follower to a circle, an error message is provided indicating that this feature is not available.

Figure 6A:
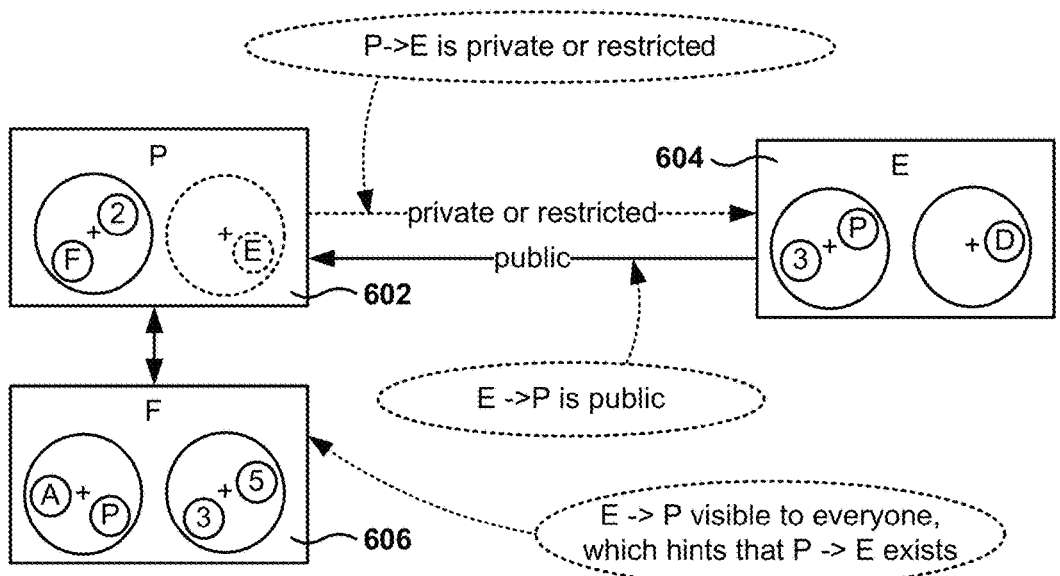
FIGS. 6A-6E illustrate embodiments of scenarios for following an entity privately.

FIGS. 6A-6E illustrate embodiments of scenarios for following an entity privately. FIG. 6A illustrates the problem where person 602 has selected to follow entity 604 privately or with restricted visibility, and the entity 604 has selected to follow person 602 publicly. If the policy is in place, users are aware that an entity may not follow a person unless this person is following the entity. In the example of FIG. 6A, user 606 has visibility to the fact that entity 604 is following person 602 (E→P), therefore, person 602 must be following entity 604 because of the policy. Person 602 wanted to follow entity 604 privately, but now others are aware that person 602 is following entity 604, defeating the purpose of following an entity privately.

Figure 6B:
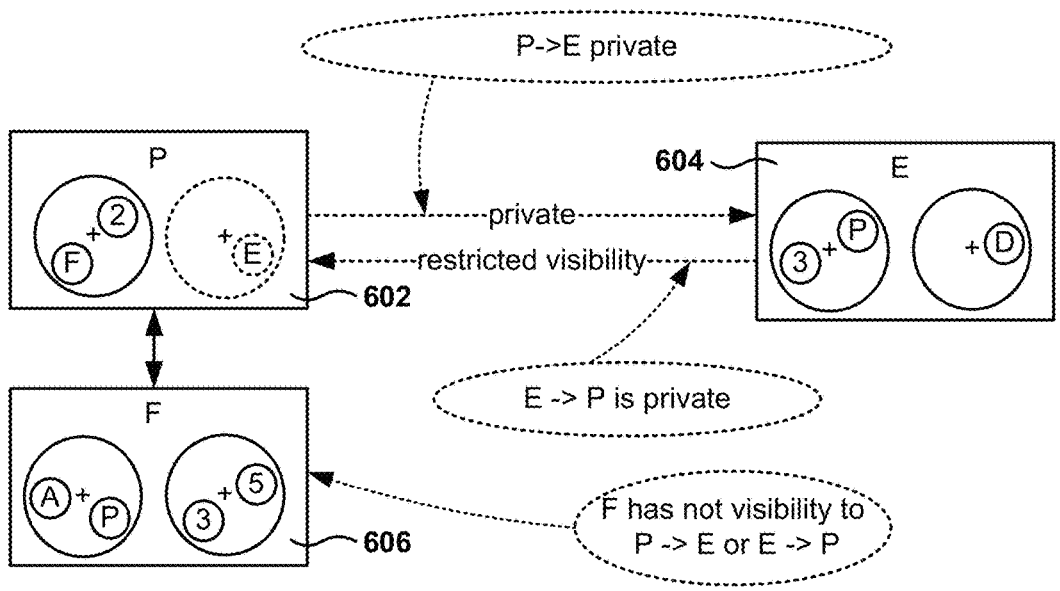

In the embodiment of FIG. 6B, person 602 is following entity 604 in a private manner, that is, no users in the social network know about this relationship except for person 602 and entity 604. In one embodiment, the follow relationship is private because user 602 has added entity 604 to an invisible circle.

Figure 6C:
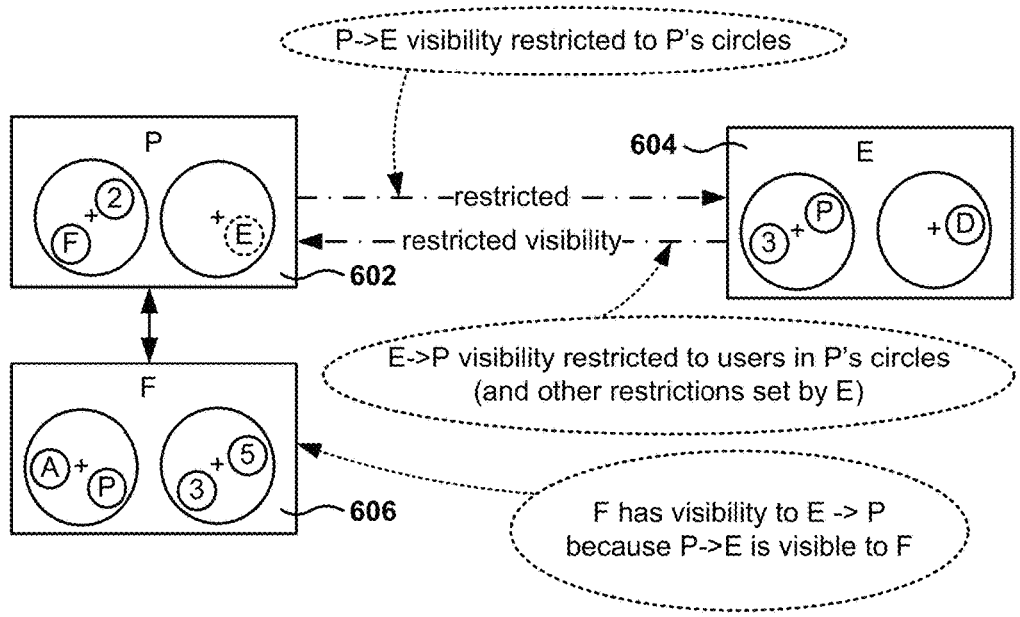

In the embodiments of FIGS. 6B and 6C, the visibility of the entity-following-person relationship is conditional on the visibility of the person-following-entity. If a viewer has visibility that the person is following the entity, then the viewer may have visibility that the entity is following person (depending on whether the viewer has visibility to the entity-following-person relationship as defined by the entity). However, if a viewer has no visibility to the person-following-entity relationship, then the viewer has no visibility to the entity-following-person relationship.

In the example in FIG. 6B, the person is following the entity privately, therefore, user 606 (e.g., the viewer) has no visibility that the person is following the entity. Consequently, users 606 will not have visibility that the entity is following the person.

In the example in FIG. 6C, the visibility of the person-following-entity relationship is restricted to users in the person's circles. Users 606 (F) is in the person's circles, therefore, user 606 has visibility that the person is following the entity. The user 606 has visibility that the person is following the entity, then the user 606 also has visibility that the entity is following the person. However, other users that are not in the person's circles, will not be able to have visibility to the entity-following-person relationship, because people not in the person's circles have no visibility that the person is following the entity.

Figure 6D:
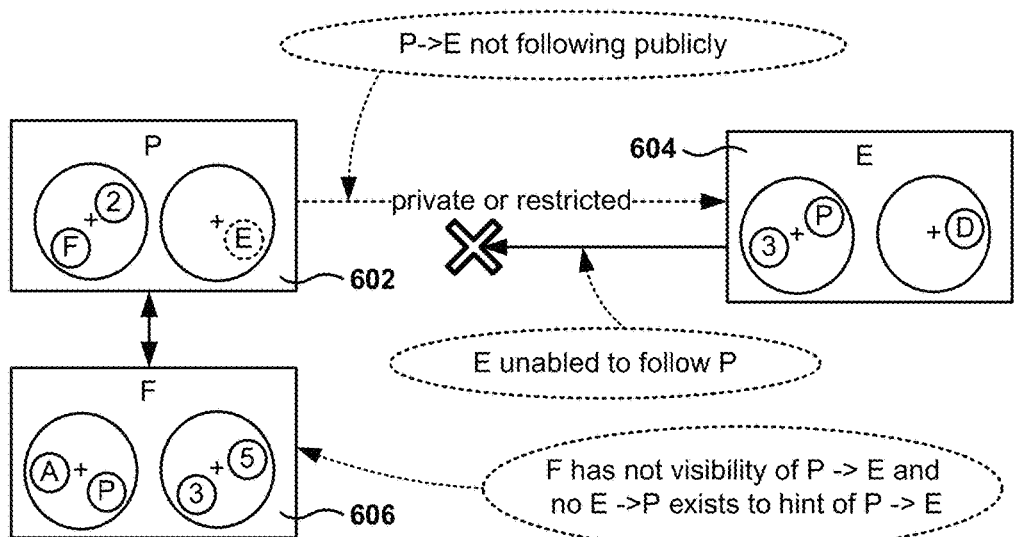

FIG. 6D illustrates an alternate embodiment to keep a private or restricted relationship hidden to others. In this embodiment, an entity is not allowed to follow (e.g. add to its circles) a user that is following the entity in a limited mode (e.g., privately or restricted to the person's circles). Since the entity is not following the person, then there is no risk that other users will find out that the person is following the entity.

Figure 6E:
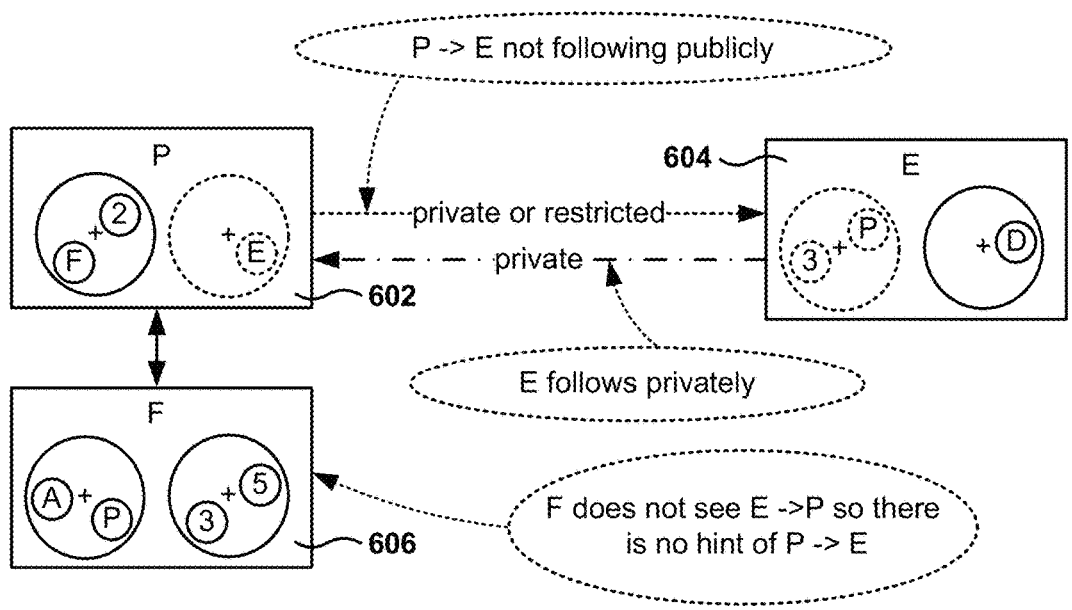

FIG. 6E illustrates another embodiment where the entity can only follow the user privately when the user is following the entity privately or with restrictions. Since the person-following-entity relationship has limited visibility, the entity has to follow the person privately. In one embodiment, the entity adds the person to a circle invisible to others.

Since the entity is following the user privately, others will not be able to see that the entity is following the user. In the example of FIG. 6E, the viewer 606 does not have visibility that the person is following the entity because the person is following the entity privately. Since the entity is also following the person privately, then viewer 606 has no visibility to any of the relationships.

Figure 7:
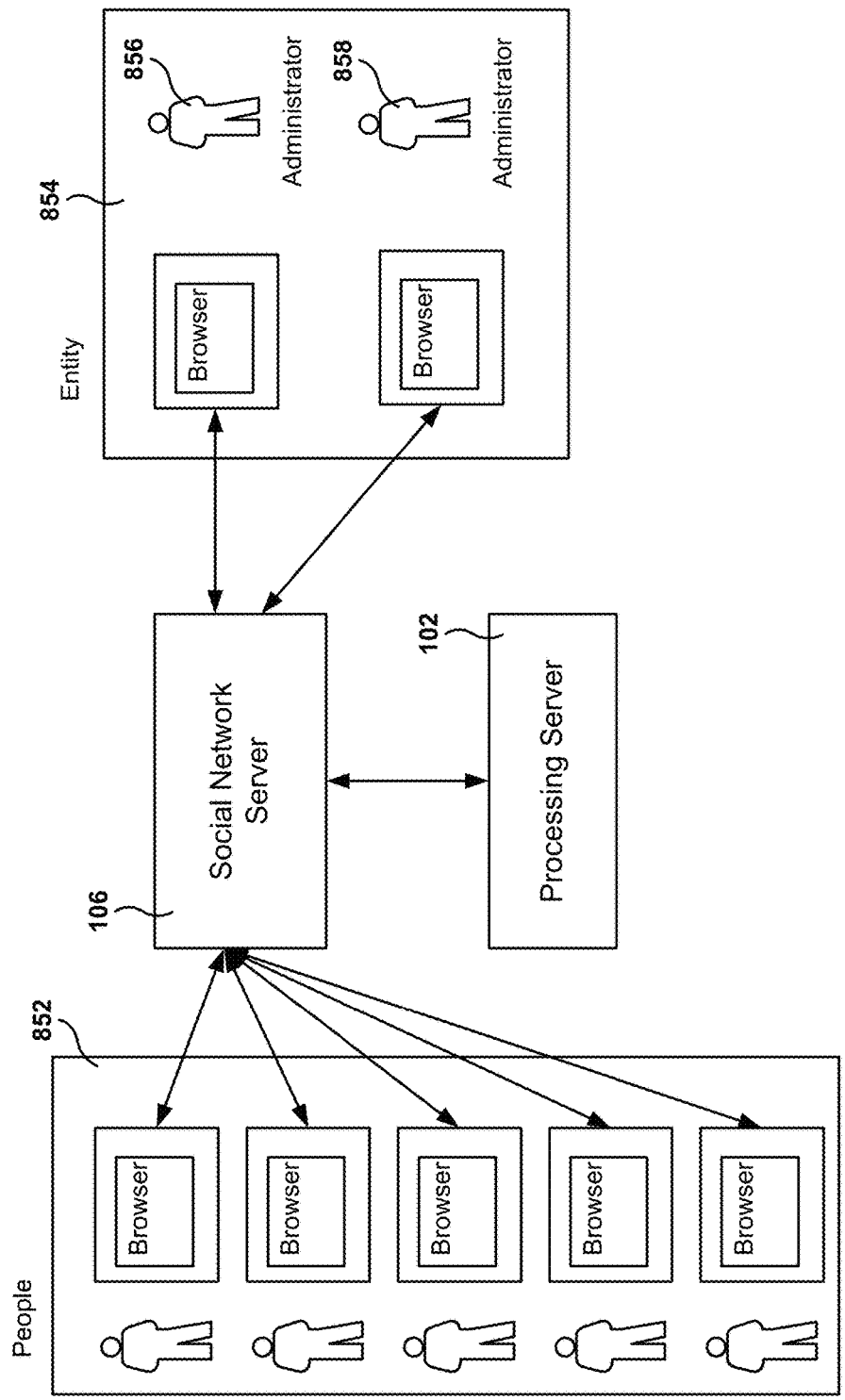
FIG. 7 shows a simplified architecture for implementing embodiments described herein.

FIG. 7 shows a architecture for implementing embodiments described herein. People 852 access the social network 106 utilizing a web browser, or some other similar application (e.g., app in smart phone). Entity 854 includes one or more administrators 856, 858 that access the social network via a network browser or some other similar application or interface provided by the social network.

Processing server 102 manages the rules for establishing social relationships within the network, and the rules for controlling the authorized recipients of electronic messages from any user in the social network. When a request is made to the social network server 106 to establish a new relationship (e.g., to start following another user), the social network forwards the requests to processing server 102, which determines if the request is authorized or denied.

For example, processing server 102 checks if a person may be added to another person's circles, or if a person may be added to an entity's circles. The processing server maintains the list of the possible operations. In one embodiment, processing server 102 provides an Application Programming Interface (API), which is utilized by social network server 106 to perform requests from the processing server 102.

In one embodiment, the rules for enabling the addition of users to another user's social network are defined by the following table:

TABLE 1

| | Person | Entity |
| --- | --- | --- |
| Person | Person may start following another person | Person may start following an entity |

TABLE 1-continued

| | Person | Entity |
| --- | --- | --- |
| Entity | Entity may not follow a person, unless the person previously establishes a formal relationship with the entity | Entity may start following another entity |

In one embodiment, processing server 102 manages the rules for providing visibility to actions and relationships within the social network. For example, processing server 102 manages visibility and relationships according to one of the scenarios described above with reference to FIGS. 6B-6E.

In one embodiment, the processing server operates at the storage layer, and these rules are enforced at the storage layer. It is appreciated that the embodiments illustrated in FIG. 7 are exemplary. Other embodiments may utilize different rules, different servers, combine the functionality of different servers into one server, distribute the functionality of one server among several servers, etc. The embodiments illustrated in FIG. 7 should therefore not be interpreted to be exclusive or limiting, but rather exemplary or illustrative.

Figure 8:
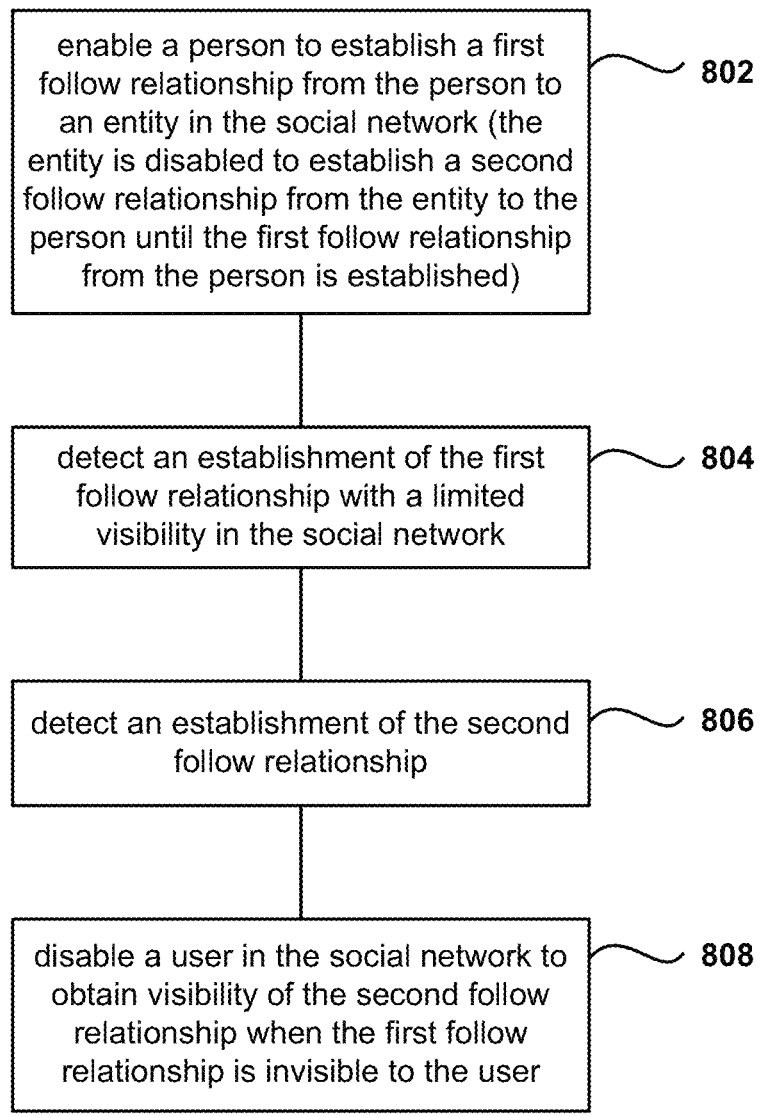
FIG. 8 shows a flowchart illustrating an process for managing the visibility of relationships within a social network, in accordance with one embodiment.

FIG. 8 shows a flowchart illustrating an process for managing the visibility of relationships within a social network, in accordance with one embodiment. In operation 902, the social network enables a person to establish a first follow relationship from the person to an entity in the social network, and the entity is disabled to establish a second follow relationship from the entity to the person until the first follow relationship from the person is established.

Further, in operation 804, the establishment of the first follow relationship is detected, where the first follow relationship is established with a limited visibility in the social network (e.g., the first follow relationship is not public). From operation 804, the method flows to operation 806, where the establishment of the second follow relationship (from the entity to the person) is detected.

From operation 806, the method continues to operation 808, where a user in the social network is disabled to obtain visibility of the second follow relationship if the first follow relationship is invisible to the user. At least one operation of the method is executed through a processor.

Figure 9:
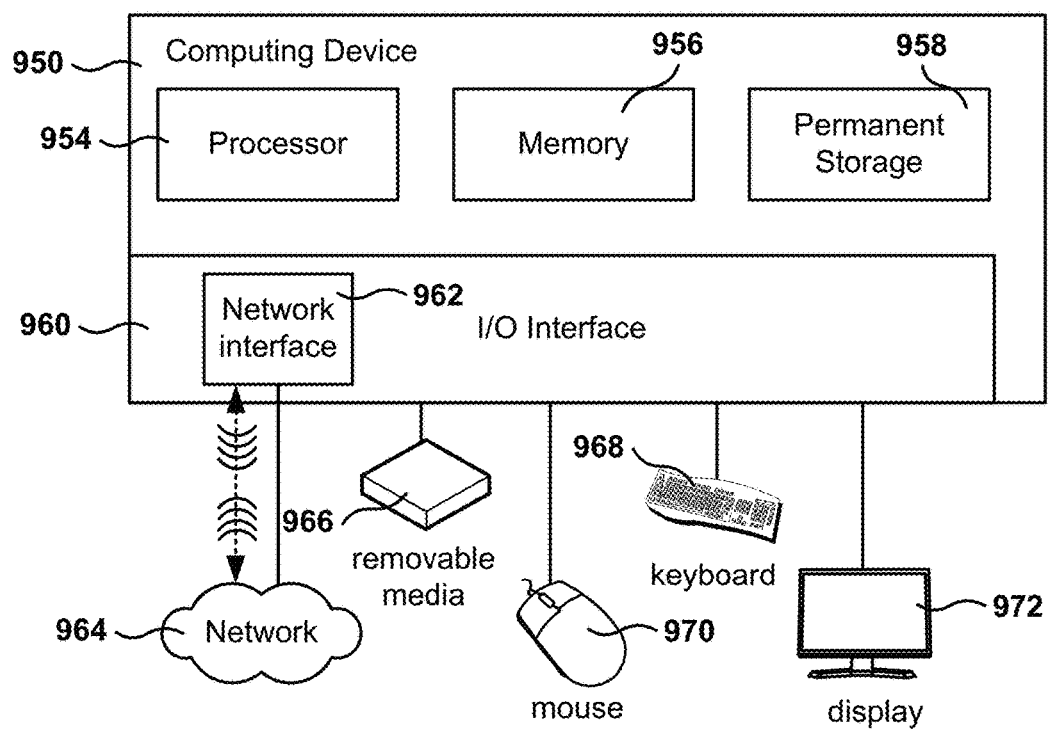
FIG. 9 is a schematic diagram of a computer system for implementing embodiments described herein.

FIG. 9 is a schematic diagram of a computer system for implementing embodiments described herein. It should be appreciated that the methods described herein may be performed with a digital processing system, such as a conventional, general-purpose computer system. Special purpose computers, which are designed or programmed to perform only one function, may be used in the alternative. The computing device 950 includes a processor 954, which is coupled through a bus to memory 956, permanent storage 958, and Input/Output (I/O) interface 960.

Permanent storage 958 represents a persistent data storage device such as a hard drive or a USB drive, which may be local or remote. Network interface 962 provides connections via network 964, allowing communications (wired or wireless) with other devices. It should be appreciated that processor 954 may be embodied in a general-purpose processor, a special purpose processor, or a specially programmed logic device. Input/Output (I/O) interface 960 provides communication with different peripherals and is connected with processor 954, memory 956, and permanent storage 958, through the bus. Sample peripherals include display 972, keyboard 968, mouse 970, removable media device 966, etc.

Display 972 is configured to display the user interfaces described herein. Keyboard 968, mouse 970, removable media device 966, and other peripherals are coupled to I/O interface 960 in order to exchange information with processor 954. It should be appreciated that data to and from external devices may be communicated through I/O interface 960. Embodiments can also be practiced in distributed computing environments where tasks are performed by remote processing devices that are linked through a wired or a wireless network.

Embodiments can be fabricated as computer readable code on a non-transitory computer readable storage medium. The non-transitory computer readable storage medium holds data which can be read by a computer system. Examples of the non-transitory computer readable storage medium include permanent storage 958, network attached storage (NAS), read-only memory or random-access memory in memory module 956, Compact Discs (CD), Blu-Ray™ discs, flash drives, hard drives, magnetic tapes, and other data storage devices. The non-transitory computer readable storage medium may be distributed over a network-coupled computer system so that the computer readable code is stored and executed in a distributed fashion.

Some, or all operations of the method presented herein are executed through a processor, such as processor 954 of FIG. 9. Additionally, although the method operations were described in a specific order, it should be understood that some operations may be performed in a different order, when the order of the operations do not affect the expected results. In addition, other operations may be included in the methods presented, and the operations may be performed by different entities in a distributed fashion, as long as the processing of the operations is performed in the desired way.

In addition, at least one operation of some methods performs physical manipulation of physical quantities, and some of the operations described herein are useful machine operations. Embodiments presented herein recite a device or apparatus. The apparatus may be specially constructed for the required purpose or may be a general purpose computer. The apparatus includes a processor capable of executing the program instructions of the computer programs presented herein.

Although the foregoing embodiments have been described with a certain level of detail for purposes of clarity, it is noted that certain changes and modifications can be practiced within the scope of the appended claims. Accordingly, the provided embodiments are to be considered illustrative and not restrictive, not limited by the details presented herein, and may be modified within the scope and equivalents of the appended claims.

What is claimed is:

1. A method comprising:
enabling input from a first person account of a first user to establish a first follow relationship from the person account to an entity in a social network, wherein the entity is disabled to establish a second follow relationship from the entity to the first person account until the first follow relationship from the first person account to the entity is established, the second follow relationship enabling the entity to publish content to the first person account in the social network;
detecting an establishment of the first follow relationship with a limited visibility in the social network in lieu of an option to establish the first follow relationship with a public visibility in the social network, wherein the limited visibility disables a second user having a second person account from having visibility to the first follow relationship;
detecting, by a processor, an establishment of the second follow relationship from the entity to the first person account with public visibility in the social network; and
blocking the second user in the social network from obtaining visibility of the second follow relationship when the first follow relationship is invisible to the second user, wherein blocking the second user in the social network from obtaining visibility includes omitting the first person account from a list of users that the entity is following when the second user views a profile of the entity, wherein a third user having visibility to the first follow relationship is given visibility to the first person account being followed by the entity.

2. The method as recited in claim 1, wherein blocking the first user in the social network from obtaining visibility further includes
omitting the person account from a list of users following the entity when the first user views a profile of the entity.

3. The method as recited in claim 1, wherein blocking the first user in the social network from obtaining visibility further includes:
omitting the entity from a list of users and entities followed by the person account when the first user views a profile of the person account.

4. The method as recited in claim 1, wherein blocking the first user in the social network from obtaining visibility further includes:
omitting the entity from a list of users and entities following the person account when the first user views a profile of the person account.

5. The method as recited in claim 1, wherein the limited visibility is one of a restricted visibility or a private visibility, wherein the restricted visibility shows a relationship to users in communications groups defined by the person account, and the private visibility makes the relationship invisible to everyone, wherein a relationship without limited visibility is viewable by everyone.

6. The method as recited in claim 1, wherein blocking the first user in the social network from obtaining visibility further includes:
detecting that the first user has visibility to the second follow relationship when considering visibility restrictions set by the entity; and
making the second follow relationship invisible to the first user if the first follow relationship is invisible to the first user.

7. The method as recited in claim 1, wherein blocking the first user in the social network from obtaining visibility further includes:
determining visibility to the first user of the first follow relationship based on visibility parameters defined by the person account and visibility parameters set by the entity.

8. The method as recited in claim 1, further including:
blocking the entity from following the person account publicly in response to the first follow relationship being limited.

9. The method as recited in claim 1, further including:
enabling the person account to define visibility of relationships in a profile of the person account.

10. The method as recited in claim 9, wherein enabling the person account to define visibility further includes:

enabling the person account to specify which communication groups are viewable; and enabling the person account to specify if people in the communication groups of the person account are one of:
  visible to everyone, or
  visible to the people in the communication groups.

11. A method comprising:
  enabling input from a first person account of a first user to establish a first follow relationship from the first person account to an entity in a social network, wherein the entity is disabled to establish a second follow relationship from the entity to the first person account until the first follow relationship from the first person account to the entity is established, the second follow relationship comprising a relationship enabling the entity to publish content to the first person account in the social network;
  detecting an establishment of the first follow relationship with a limited visibility in the social network in lieu of an option to establish the first follow relationship with a public visibility in the social network, wherein the limited visibility blocks a second user having a second person account from obtaining visibility to the first follow relationship;
  blocking the entity from establishing the second follow relationship with public visibility in the social network when the first follow relationship has limited visibility, wherein blocking the entity from the second follow relationship includes omitting the first person account from a list of users that the entity is following when the second user views a profile of the entity, wherein a third user having visibility to the first follow relationship is given visibility to the first person account being followed by the entity; and
  detecting, by a processor, an establishment of the second follow relationship from the entity to the first person account with limited visibility in the social network.

12. The method as recited in claim 11, wherein operations of the method are performed by a computer program when executed by one or more processors, the computer program being embedded in a non-transitory computer-readable storage medium.

13. A computer program embedded in a non-transitory computer-readable storage medium, when executed by one or more processors, the computer program comprising:
  program instructions for enabling input from a first person account of a first user to establish a first follow relationship from the first person account to an entity in a social network, wherein the entity is disabled to establish a second follow relationship from the entity to the first person account until the first follow relationship from the first person account to the entity is established, the second follow relationship enabling the entity to publish content to the first person account in the social network;
  program instructions for detecting an establishment of the first follow relationship with a limited visibility in the social network in lieu of an option to establish the first follow relationship with a public visibility in the social network, wherein the limited visibility disables a second user having a second person account from having visibility to the first follow relationship;
  program instructions for detecting an establishment of the second follow relationship from the entity to the first person account with public visibility in the social network; and
  program instructions for blocking the second user in the social network from obtaining visibility to the second follow relationship when the first follow relationship is invisible to the second user, wherein blocking the second user in the social network from obtaining visibility further includes omitting the first person account from a list of users and entities that the entity is following when the second user views a profile of the entity, wherein a third user having visibility to the first follow relationship is given visibility to the first person account being followed by the entity.

14. The computer program as recited in claim 13, wherein blocking the first user in the social network from obtaining visibility further includes:
  program instructions for omitting the person account from a list of users and entities following the entity when the first user views the profile of the entity.

15. The computer program as recited in claim 13, wherein blocking the first user in the social network from obtaining visibility further includes:
  program instructions for omitting the entity from a list of users and entities followed by the person account when the first user views the profile of the person account.

16. The computer program as recited in claim 13, wherein detecting an establishment of the first follow relationship with a limited visibility further includes:
  program instructions for detecting an addition of the entity to a group of the person account with limited visibility.

17. The computer program as recited in claim 13, further including:
  program instructions for enabling the person account to specify which communication groups are viewable; and
  program instructions for enabling the person account to specify if people in the communication groups of the person account are one of:
    visible to everyone, or
    visible to the people in the communication groups.

18. A system comprising:
  a social network server that enables establishment of a first follow relationship from a first person account of a first user to an entity in the social network; and
  a processing server that disables an establishment of a second follow relationship from the entity to the first person account until the first follow relationship from the person account to the entity is established, the second follow relationship enabling the entity to publish content to the first person account in the social network, wherein the processing server, upon detecting the establishment of the first follow relationship with a limited visibility in the social network in lieu of an option to establish the first follow relationship with a public visibility in the social network and upon detecting the establishment of the second follow relationship from the entity to the person account, blocks a second user in the social network from obtaining visibility of the second follow relationship when the first follow relationship is invisible to the second user, wherein to block the second user in the social network from obtaining visibility the processing server omits the first person account from a list of users and entities that the entity is following when the second user views a profile of the entity, wherein a third user having visibility to the first follow relationship is given visibility to the first person account being followed by the entity, wherein the limited visibility disables the second user from having visibility to the first follow relationship, wherein the second follow relationship is established with public visibility to users of the social network.

19. The system as recited in claim 18, wherein the processing server omits the person account from a list of users and entities following the entity when the first user views a profile of the entity.

20. The system as recited in claim 18, wherein the processing server omits the entity from a list of users and entities followed by the person account when the first user views a profile of the person account.

21. The system as recited in claim 18, wherein the processing server omits the entity from a list of users and entities following the person account when the first user views a profile of the person account.

22. The system as recited in claim 18, wherein the limited visibility is one of a restricted visibility or a private visibility, wherein the restricted visibility shows a relationship to users in communications groups defined by the person account, and the private visibility makes the relationship invisible to everyone, wherein a relationship without limited visibility is viewable by everyone.

\* \* \* \* \*